United States Patent [19]

Orlanda

[11] 4,250,969
[45] Feb. 17, 1981

[54] MECHANICAL HOE
[76] Inventor: Pedro Orlanda, Rua Maestro Grossi, 318, Jaboticabal, Sao Paulo, Brazil
[21] Appl. No.: 81,196
[22] Filed: Oct. 2, 1979
[30] Foreign Application Priority Data
Oct. 3, 1978 [BR] Brazil .................................. 7086586
[51] Int. Cl.³ ...................... A01B 39/08; A01B 39/10; A01B 39/18
[52] U.S. Cl. ........................................ 172/97; 172/91; 172/110; 172/125
[58] Field of Search ...................... 172/97, 91, 110, 84, 172/88, 125

[56]     References Cited
U.S. PATENT DOCUMENTS

| 923,163 | 6/1909 | Gaston | 172/84 |
|---|---|---|---|
| 1,636,219 | 7/1927 | Dion | 172/110 X |
| 2,280,372 | 4/1942 | Carlson | 172/110 X |
| 2,769,382 | 11/1956 | Vacek | 172/110 X |

FOREIGN PATENT DOCUMENTS

| 92401 | 5/1959 | Netherlands | 172/91 |
|---|---|---|---|
| 2496 | 7/1875 | United Kingdom | 172/110 |

Primary Examiner—Paul E. Shapiro
Attorney, Agent, or Firm—Emory L. Groff, Jr.

[57]     ABSTRACT

A cultivating attachment mounted on a tractor is driven by the power take-off drive of the tractor to simulate the customary action of a hoe when it is manually manipulated. The desired effect is achieved by providing a pair of ground engaging rotatable cutting elements at the ends of an arm mounted on a chassis which is connected to the tractor frame. Shafts are connected to the ends of the arm and also eccentrically connected to plates which are rotated by a drive connected to the power take-off of the tractor. Movement of the eccentrics imparts an oscillating and vertical movement to the arm and the cutting elements connected thereto as the cutting elements engage the ground being cultivated.

7 Claims, 3 Drawing Figures

MECHANICAL HOE

This invention relates to a cultivating attachment for a tractor which simulates the action of a manually used hoe. Not withstanding the growing development of farm implements for the conservation of cultivated soil, there has not yet been developed a mechanical implement capable of being an efficient substitute for the type of work done by a manual hoe.

When a manual hoe is used, it is struck into the soil on a substantially horizontal plane, with rapid, short up and down movements at a shallow soil depth which is sufficient to hoe the vegetation without destroying the roots which must be preserved to avoid erosion. Such an operation cannot be performed with presentday machinery which commonly uses blades or rotating or vibrating discs and which, unlike manual hoes, pulverize the soil, destroy the roots and permit water runoff with no penetration into the soil.

The object of the present invention is to provide a mechanical implement which can be connected to a tractor and can perform a hoeing operation analagous to a manual hoe but with the advantages of mechanization which results in a more efficient hoeing operation even on difficult jobs such as hoeing narrow rows of plants on coffee plantations.

Structurally, the new implement departs from the basic arrangement of traditional cultivating implements for use with tractors wherein the downwardly rotating cutting elements are located at the far ends of a horizontal arm, which rotates around a center pin which is attached to the chassis of the cultivating implement. The fundamental characteristic of the invention is that a horizontal arm on which a plurality of cutting elements are located oscillates, rather than rotates, around a center pin and, when operating, makes short, rapid, alternating up and down movements, transversely or obliquely to a line of the tractors's path. These continuous and uninterrupted movements are controlled by means of an alternating drive, provided by a pair of eccentric shafts connected to the tractors's drive mechanism.

The attached drawings illustrate a preferred form of the invention wherein.

Figure 1:
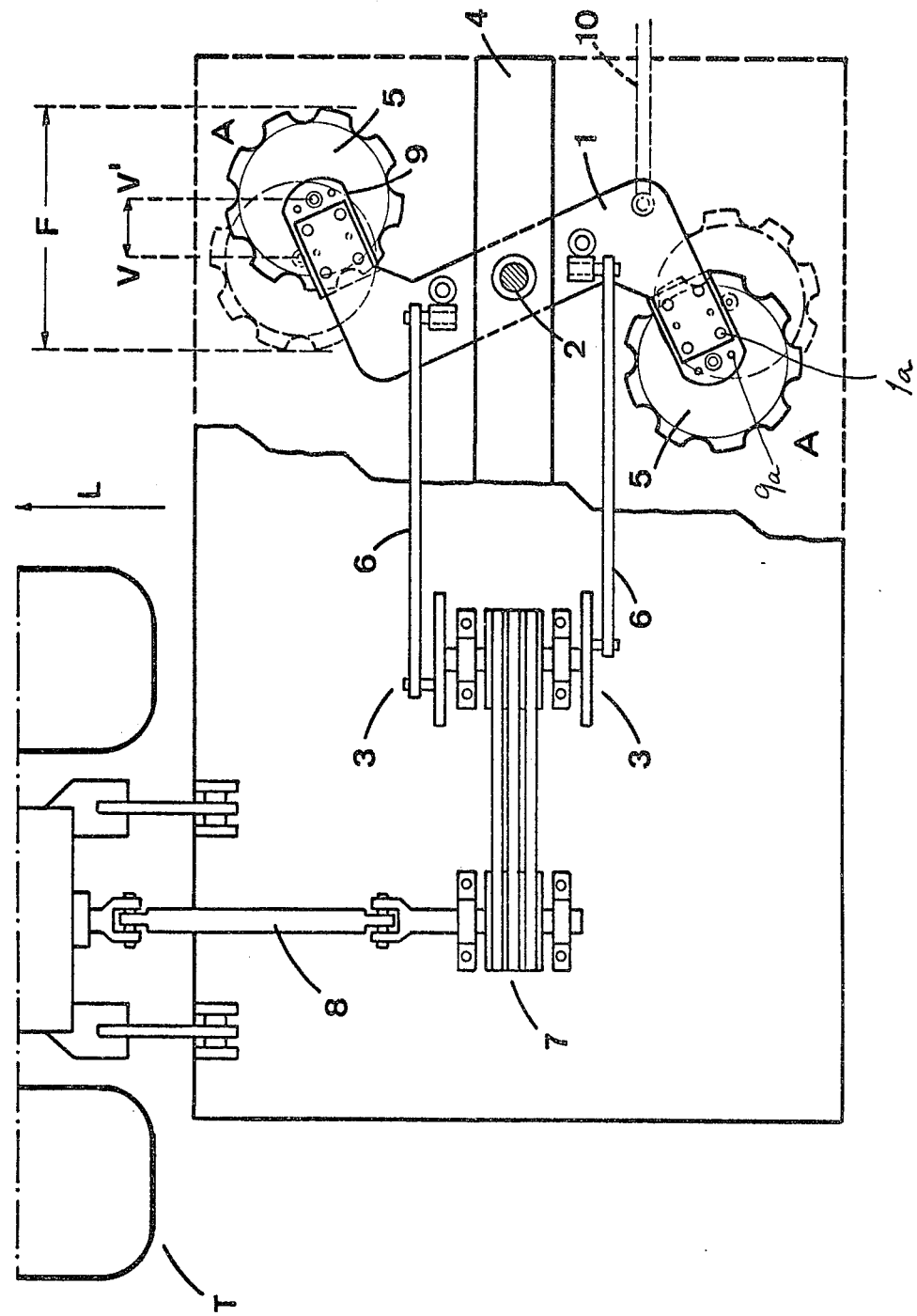
FIG. 1 is a fragmentary top plan view showing the implement connected to a tractor with an arm of the implement, on which a pair of cutting elements are mounted, one of the cutting elements being in a maximum advance position of its oscillating movement around a center pin.
Figure 2:
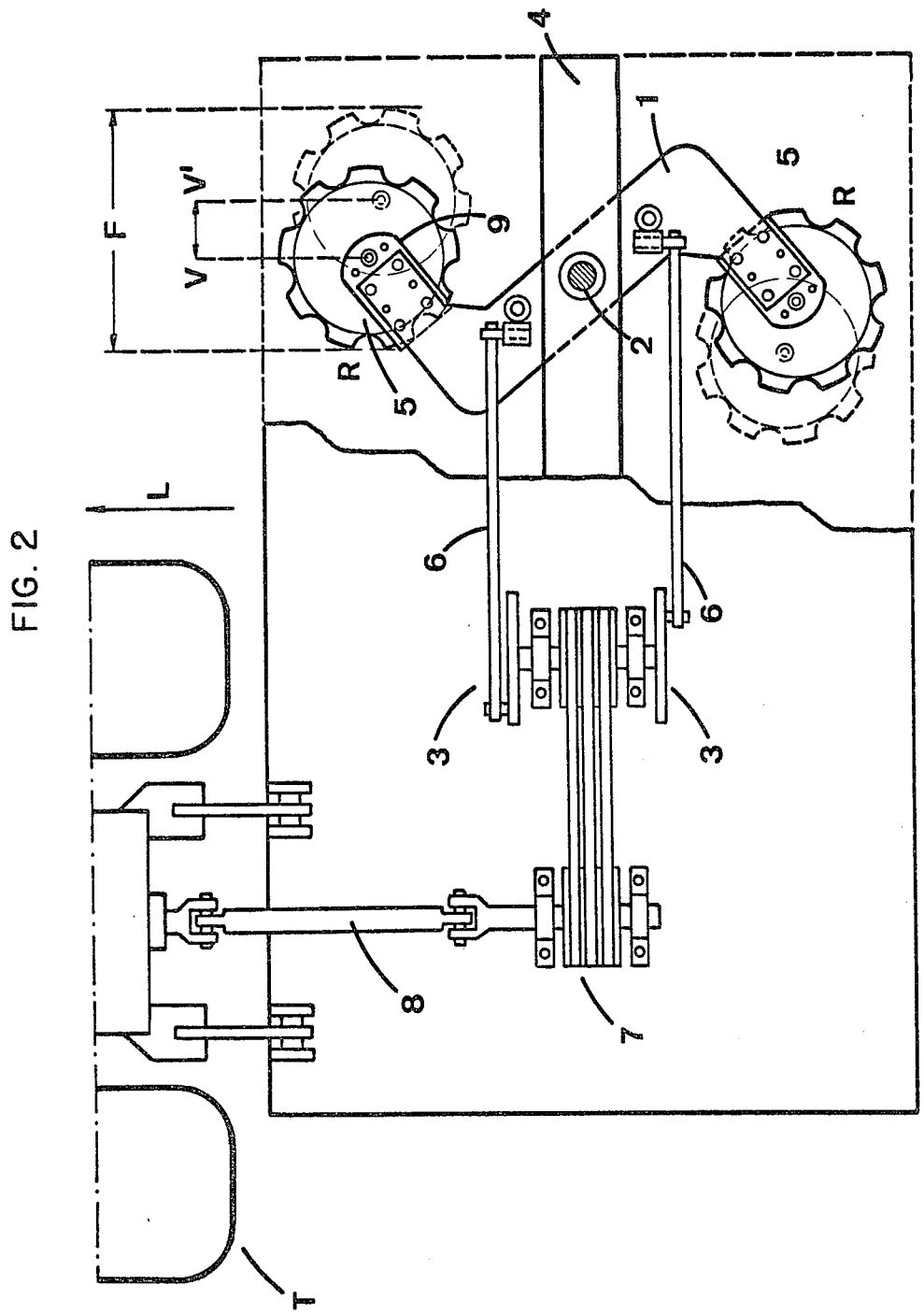
FIG. 2 is a fragmentary top plan view similar to FIG. 1 showing the arm and the cutting elements in a return position of its oscillating movement around the center pin.
Figure 3:
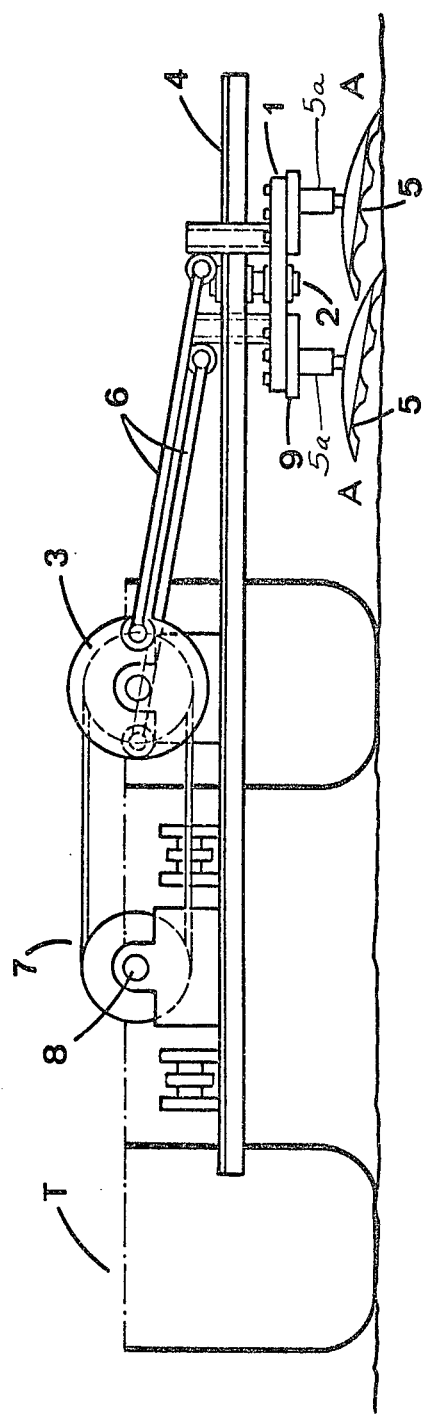
FIG. 3 is a rear view of the implement in the position of maximum advance of the arm shown in FIG. 1.

Referring to the drawings in detail, the cultivating implement includes a chassis 4 attached to the frame of the tractor. A support arm 1 of substantially Z-shape is oscillatingly mounted on a center pin 2 fixed to the chassis 4 and circular cutting elements 5 are rotatably mounted at the opposite ends of the support arm on shafts 5a. A pair of shafts 6 of equal length are each connected at one end to the support arm 1 and are mounted eccentrically at their other ends to rotatable circular plate members 3 which are in turn connected to the tractor drive means by a belt and pulley arrangement 7 and a drive shaft 8. As shown in the drawings, the ends of the shafts connected to the circular plate members are positioned at points approximately 180° apart on the respective plate members. In view of the Z-shape of the support arm 1 and the position of the cutting elements 5 thereon, a hoeing swath F is produced which is limited by the far ends of the cutting elements 5 in the position of maximum advance A as illustrated in FIG. 1. The action of the cutting elements provides a perfect clearing of the terrain along the entire area to be worked. The position of the cutting elements 5 at the ends of the arms 1 may be adjusted by means of plates 9 located above said elements and secured to shafts 5a. The plates 9 are provided with a plurality of spaced openings 9a which may be aligned with openings 1a in the ends of support arm 1 and be connected to the support arm by appropriate fastener means passing through the aligned openings. The adjustment of the cutting elements permits increasing or decreasing the width of the swath without altering the extent of the oscillating movement of the arm.

An important advantage of the implement is its high operational performance which requires a minimum of power from the tractor due to the perfect balance of the oscillating system. The rapid and continuous up and down and oscillating movements of the support arm 1, supplemented by the relatively small path of movement V-V' which is very similar to a manual hoe, makes possible a greater tractor speed, with excellent work results. At the same time, the rapid transverse or oblique movement relative the tractor's path, avoids the accumulation of cleared material in front of the implement since the material is continuously thrown to the side by the cutting elements 5.

The present invention will produce, in contrast to known mechanized cultivating or hoeing operations, a pelletizing effect, rather than pulverization, which is greatly harmful to the soil, and will thus preserve the root system of the vegetation being hoed, which is absolutely essential for maintaining water in an irrigation system and healthy plant life.

Obviously, the invention will permit the implement to be fitted with as many cutting elements as desired, on one or both of the rear sides of the tractor and even at other points in relation to the tractor, depending on the means chosen for producing the oscillating movement. If an additional group of cutting elements is desired, the drive of such groups can be carried out, for example, from the basic group of cutting elements by means of a simple, rigid bar 10 linking the respective support arms 1, as illustrated by the dotted lines in FIG. 1.

I claim:

1. Cultivating apparatus for attachment to a tractor, said tractor including a frame, motive power means, rear wheels driven by said power means and power take-off means, said cultivating apparatus comprising a chassis, the inboard end of which is connected to the frame behind said rear wheels and disposed at substantially a right angle thereto, the outboard end of said chassis extending to one side of the tractor beyond the line of travel of said wheels, an arm mounted on a shaft at the outboard end of said chassis beneath the lower surface thereof, said arm capable of pivotal and vertical movement on said shaft, cutting elements rotatably mounted on opposite ends of said arm and extending downwardly therefrom, eccentric means carried by said chassis means connecting said eccentric means to said arm adjacent the ends thereof, means connecting said eccentric means to the power take-off means of said tractor to actuate said eccentric means whereby upon actuation of said power take-off means, said eccentric means imparts both vertical and oscillatory movement to said arm causing said cutting elements to perform a cultivating operation simulating manual hoeing movement.

2. Cultivating apparatus according to claim 1 including, means on each end of said arm for adjusting the position of said cutting elements relative to its related arm end to provide for increasing or decreasing the width of the swath of the cutting elements without altering the extent of travel of the oscillating movement of the arm.

3. Cultivating apparatus according to claim 2 wherein, the means for adjusting the position of said cutting elements comprises a flat plate connected with said cutting elements, said plates provided with a plurality of spaced openings, the ends of said arm having a plurality of spaced openings therein and fastener means fitted in selected openings to connect said plates to said arms.

4. Cultivating apparatus according to claim 1 wherein, said cutting elements are discs provided with downwardly projecting spaced apart cutting surfaces.

5. Cultivating apparatus according to claim 1 wherein, said arm is of substantially Z-shape.

6. Cultivating apparatus according to claim 5 wherein, said means connecting said eccentric means to said arm includes a pair of shafts, one end of each shaft being connected to the upper surface of said arm, the other end of each shaft being eccentrically mounted on a driven circular plate member.

7. Cultivating apparatus according to claim 6 wherein the means for connecting said eccentric means to the power take-off means comprises a pulley and chain drive for driving said plate members and a drive shaft connecting said power take-off means to said pulley and chain drive.

* * * * *